United States Patent [19]

Sugisawa et al.

[11] Patent Number: 4,483,879

[45] Date of Patent: Nov. 20, 1984

[54] METHOD OF PREPARING DRIED NOODLES

[75] Inventors: Ko Sugisawa; Fumio Matsui, both of Nara; Yozo Yamamoto, Kyoto; Ryusuke Nakanaga, Takatsuki; Nobuji Takeda, Nara; Yoshimasa Fujii, Yamatokooiriyama; Yoshitaka Hirano, Takatsuki, all of Japan

[73] Assignee: House Food Industrial Company Limited, Osaka, Japan

[21] Appl. No.: 439,217

[22] Filed: Nov. 4, 1982

[30] Foreign Application Priority Data

Nov. 9, 1981 [JP] Japan .................................. 56-178419
May 29, 1982 [JP] Japan .................................. 57-91840

[51] Int. Cl.$^3$ .............................................. A23L 1/16
[52] U.S. Cl. .................................... 426/451; 426/557; 426/511

[58] Field of Search ............... 426/451, 458, 557, 510, 426/511

[56] References Cited

U.S. PATENT DOCUMENTS 4,208,439 6/1980 Hsu ...................................... 426/557
4,271,205 6/1981 Kaneko .............................. 426/451

FOREIGN PATENT DOCUMENTS 2339245 2/1975 Fed. Rep. of Germany ...... 426/557

*Primary Examiner*—George Yeung
*Attorney, Agent, or Firm*—Oblon, Fisher, Spivak, McClelland & Maier

[57] ABSTRACT

A method for producing dried instant noodles containing less than 15% moisture as a final product. It is characterized by dehydrating raw noodles containing 35-45% moisture using super-heated steam and adjusting evaporation of water from the noodles at the rate of 0.25-1.00 g/second per 100 g of the raw noodles.

12 Claims, No Drawings

METHOD OF PREPARING DRIED NOODLES

BACKGROUND OF THE INVENTION

The present invention relates to a method for producing dried noodles having a high expansion rate and a desirable state of expansion as well as a favorable taste when reconstituted.

So far, for producing dried noodles, various methods have been applied to dehydrate raw noodles. One of such methods is dehydration using heated air. The noodles obtained by this method do not have a desirable high expansion rate and reconstitution property. They also require prolonged periods for reconstitution and the reconstituted noodles are not soft enough as the core of the noodle strips remains hard.

Compared with the above heated air dehydration, dehydration using super-heated steam is more advantageous for producing noodles with a higher expansion rate. However, it has been difficult to make raw noodles expand uniformly under the traditional application conditions, thus causing cracks and blisters of the noodles. They had a poor appearance and an unfavorable sticky taste when reconstituted.

Such undesirable tendency was more obvious in case of noodle strips with a longer diameter. Moreover, when raw noodles were molded into a lump and dehydrated, their state of dehydration was inhomogeneous or the lump was deformed and/or contracted, i.e., the surface of the lump became uneven, to cause inefficient dehydration and cracking (breaking) of the noodle strips after certain period of their preservation.

SUMMARY OF THE INVENTION

It is an object of this invention to provide dried instant noodles having a higher expansion rate so that they are reconstituted into a food preparation within an extremely short period.

It is a further object of the present invention to provide dried instant noodles having a state of uniform expansion and a desirable texture as well as appearance without any cracks or blisters.

It is another object of this invention to provide dried instant noodles which are suitably soft when reconstituted and have a taste similar to that of the conventional boiled noodles (the noodles prepared by kneading wheat flour with Kampun, seasoning and water, rolling the obtained dough into a sheet and cutting the sheet into strips, or extruding the strips from an exruder and treating them with heat (usually boiling) as they are for consumption).

It is also an object of this invention to provide a method for dehydrating raw noodles using super-heated steam, which is applicable to raw noodle strips with a longer diameter and by which it is possible to obtain dried instant noodles having excellent expansion and reconstitution properties.

It is a further object of the present invention to provide a method of super-heated steam dehydration, by which raw noodles molded in a lump are dehydrated sufficiently and uniformly without causing contraction or deformation of the noodle lump.

It is a further object of this invention to provide dried instant noodles of which strips won't break even after a long period of preservation.

DETAILED EXPLANATION OF THE INVENTION

The dried instant noodles prepared according to the method of this invention include not only those which are readily reconstituted only by immersing them in hot water for a few minutes but also those which are reconstituted by boiling in water for a few minutes. However, their cooking time is far shorter than that required for the conventional dried noodles.

According to the present invention, a dough is prepared by kneading wheat flour, Kampun (a powder mixture of alkali metal carbonates and phosphates) and seasoning with water. The dough is rolled into a sheet and the sheet is cut into strips having a typical width of 0.8–6 mm. with a cutting roller, or the dough is extruded from a nozzle of the extruder to obtain strips of desired shape. The noodle strips obtained in this manner contain 35–45% moisture.

The dough can be rolled by any kind of roller. However, it is desirable to use such a roller as it does not destroy the net structure of gluten in the dough and impart the structure its consistent direction. In other words, a roller that gives the smallest residual stress to the dough is preferred, thus enabling the subsequent dehydration process using super-heated steam to produce dried noodles with a high expansion rate. An extruder can also be used instead of a roller to press out and mold the dough.

The method of the present invention can be applied not only to a separated individual noodle but also to a lump of noodles to impart favorable properties to the resulting dried instant noodles.

In the present invention it is highly effective to adjust the moisture content of raw noodles between 35–45%, because the noodles with such a moisture content expand uniformly and won't crack in the subsequent super-heated steam dehydration.

In recent conventional methods for producing dried instant noodles, raw noodles were prepared to contain 30–33% moisture so that they were suitable for effective rolling and dehydration. However, the present inventors found that when raw noodles with such a moisture content are dehydrated using super-heated steam, they expand unevenly to cause layers of cracks in the noodle strips, which results in cracking up of the strips when reconstituted in hot water. They further discovered as described above that this problem was overcome by increasing the moisture content to 35–45%. Alghough this higher moisture content is an essential factor of the present invention, the moisture content higher than 45% causes trouble in the rolling process, etc. and raw noodles need a prolonged period of dehydration. Therefore, it is not suitable for commercial production of instant noodles.

In this invention, the raw noodles obtained as above are directly dehydrated with super-heated steam without any heat treatment beforehand such as steaming or boiling to form α-starch in the noodles. The inventors found that if the starch in the noodles is converted into α-starch, a film is formed to cover the surface of the noodles and their interior tissue solidifies due to heat denaturation, which causes blisters and cracks in them when they are dehydrated with super-heated steam.

In case of producing dried noodles in a lump, raw noodle strips are cut into batches for each serving, forced apart if necessary, and evenly packed in a perforated mold having the square or elliptic shape. The molded noodle lump is then dehydrated with super-heated steam.

If only the surface of raw noodle strips is hardened by blowing air against them before their dehydration, preferably before forcing them apart, inhomogeneous dehydration as well as contraction or deformation of the noodle lump can be effectively prevented. Such hardening treatment is different from the afore-mentioned treatment such as steaming or boiling for the formation of α-starch.

The problems of inhomogeneous dehydration and contraction or deformation of the noodle lump are characteristic of the super-heated steam dehydration and will be explained in details later.

In order to harden the surface of raw noodles effectively, it is important to let the water evaporate only from their surface as quickly as possible without increasing the temperature of the whole noodles. Such an increase of the temperature causes softening of the noodles. Also, if water evaporates from every part of the noodles, the desirable expansion effect upon them, which is the most important advantage of super-heated steam dehydration, is not attained properly. As a result, it is desirable to use the air as dry as possible adjusting its temperature at 35°–65° C., and blow it against raw noodles at the rate of 1–3 m./second for 10–30 seconds. The suitable amount of water to be evaporated from the noodles is 0.3–3% by weight in order to attain the desirable hardening effect.

Furthermore, in the present invention, treatment of aging is given to a dough or its sheets or strips at any time before dehydration with super-heated steam for the purpose of preventing cracks of the noodle strips during the subsequent dehydration process and of increasing the expansion rate of the noodles to be dehydrated. The noodles obtained like this can be reconsituted more adequately to give a favorable taste similar to that of hand-made noodles.

The aging treatment is more effective for the noodle strips with a longer diameter which so far have been considered difficult to dehydrate uniformly. The dried noodles as a final product show favorable state of expansion and are reconstituted well.

The aging treatment in this invention means to let an object to be treated stand for a certain period of time without increasing or decreasing its moisture content. For example, the object is left standing in a room for about 5–90 minutes, of which temperature is adjusted at around 5°–40° C. and humidity at such that the moisture content of the object maintains equilibrium. If the temperature of the room is lower than 5° C., the object starts to solidify and no aging effect can be obtained, while the temperature higher than 40° C. causes softening of the object so that the texture in it can not get strong enough to expand on dehydration. On the other hand, if the aging period is shorter than 5 minutes, the intended effect can not be obtained, while the aging period longer than 90 minutes lowers the expansion rate from the same reason as in the case of storing in a room at higher than 40° C.

The desirable conditions for aging is to leave an object standing at 20°–35° C. for 10–30 minutes. Another method for aging is to seal an object to be treated with a plastic sheet and let it stand preventing its dehydration.

The raw noodles obtained in this manner are dehydrated with super-heated steam maintaining the evaporation of the water in them at 0.25–1.00 g/second per 100 g of the noodles. This dehydration condition is chosen based on the finding after various experiments that the evaporation rate of water in raw noodles during their dehydration with super-heated steam mostly determines the expansion of the noodles, and that the dehydration with a certain evaporation rate gives the dried noodles having a desirably high expansion rate in every part of them.

The moisture content of the raw noodles being dehydrated with super-heated steam first increases as condensation of the steam applied occurs on their surface, and then decreases very rapidly to complete the dehydration. This does not happen in case of dehydration with hot air. The evaporation rate, therefore, means an average rate of water evaporation from raw noodles which takes place from the time when the moisture content of the noodles is the highest due to said condensation until the completion of the dehydration.

When the average evaporation rate is lower than 0.25 g/second, the expansion rate of noodles are low so that they can not be reconstituted sufficiently. Especially noodle strips with a longer diamter take a prolonged period for their reconstitution, and the reconstituted noodles are not soft enough giving an unfavorable taste. On the other hand, the evaporation rate higher than 1.00 g/second results in considerably uneven heating on the surface and the interior of noodle strips, so that some parts of them can be scorched or cracked badly.

The evaporation rate in the present invention depends on various factors such as the temperature of the super-heated steam applied, the moisture content of raw noodles, their diameter, their density if molded in lumps, and the moisture content of the dehydrated noodles. The preferred rate of water evaporation in raw noodles is 0.25–1.00 g/second per 100 g of the raw noodles. The preferable temperature of the super-heated steam is 120°–350° C.

In order to carry out the dehydration of this invention effectively under said evaporation rate, the condition in one of the embodiments of the present method is illustrated as below; the steam temperature at 160°–200° C., and the blowing rate and time of 2–13 m./second and 40–160 seconds respectively.

When raw noodles were molded into a lump and dehydrated using super-heated steam, there used to be several problems caused by the dehydration mechanism characteristic of the super-heated steam. As mentioned before, condensation of the steam occurs on the surface of raw noodles in the beginning of the dehydration, which often causes the noodle strips to stick to each other or their noodle lump to deform due to softening of them. Since such noodles are dehydrated as they are, uniform dehydration can not be accomplished and the dehydration can not be performed efficiently. Moreover, the noodle lump shrinks or deforms to cause the uneven surface of the lump. Such problems can be overcome by blowing air against raw noodles before dehydration to harden only the surface of the raw noodle strips or by the following methods.

One of the effective methods to solve the above-mentioned problem is to carry out dehydration using the super-heated steam mixed with 2–12% of air (by volume of the super-heated steam). This is a completely new finding that overthrows the traditional idea in this industry, i.e., an admixture of air to super-heated steam inhibits the desirable dehydration and, therefore, should be avoided.

In case the amount of air mixed is less than 2%, the above-mentioned problems can not be overcome. While, the admixture of air in an amount of more than 12% spoils the whole advantages of the dehydration, thus lowering the expansion rate of raw noodles and resulting in an unfavorable taste when the noodles are reconstituted, i.e., the reconstituted noodles have a taste of raw wheat flour.

The admixture of air in an amount of 2-12% (by volume of super-heated steam) prevents inhomogeneous dehydration as well as deformation of noodle lumps, taking a maximum advantage of the super-heated steam dehydration. The dried noodles produced according to the above manner have not only a desirable state of expansion but also a favorable taste when reconstituted.

The dehydration using a mixture of super-heated steam and air is effectively carried out by compressing the steam and air into a drying chamber and adjusting their mixing ratio by an air sensor which controls the amount of air admixed. On this occasion it is preferred to adjust beforehand the temperature of the air to be mixed at nearly the same degree as that of the super-heated steam by sending the air through, for example, a heater.

Another method to overcome the afore-mentioned problems is to blow the super-heated steam against raw noodles upwardly from their bottom. Because of the upward flow of the super-heated steam, the raw noodles placed in a perforated container are kept suspended in it without sticking to each other.

The blowing of the steam is continued at the rate of 4-12 m./second at least while the moisture content of the noodles once increases due to the steam condensation on the surface of the noodles and then gradually reduces back to the original content. Adhesion of each noodle strips or softening of them, which causes inhomogeneous dehydration or contraction and deformation of noodle lumps, occurs only during this particular period.

The steam is reversed afterwards at a suitable time maintaining the same blowing rate in order to ensure homogeneous dehydration.

As to the optimum blowing rate of super-heated steam, i.e., 4-12 m./second, if the rate is lower than 4 m./second, noodles treated can not be kept suspended in a container by the steam, whereas the super-heated steam at a rate of higher than 12 m./second can deform the original shape of noodle lumps and the noodle strips stick to each other.

Consequently, the above explanation relating to the super-heated steam treatment is itemized into the following three methods:
(i) Dehydrating the surface of raw noodles by blowing air,
(ii) Using super-heated steam mixed with 2-12% of air (by volume of the super-heated steam),
(iii) Blowing super-heated steam against raw noodles upwardly from their bottom in the beginning of the dehydration and reversing the steam direction afterwards.

These methods can be applied singly or in combination to obtain better effect.

The dehydrated noodles produced by the method of the present invention contain less than 15% of moisture. If the moisture content is higher than 15%, the noodles have a poor shelf life as an instant food.

In this invention, raw noodles can be dehydrated first by the present method using super-heated steam, and after a certain time the dehydration is taken over by other methods such as heated air dehydration or microwave dehydration. Such replacement gives no harm on the final effect of the present invention.

When dried noodles produced are those molded in a lump, after certain period of their preservation, the central portion of the noodle lump gets distorted or the noodle strips near this central area begin to break so that the lump develops a poor appearance and the broken pieces of the noodles give an unfavorable taste when reconstituted in hot water.

This problem of preservation were elucidated by the present inventors as below:

Since the super-heated steam dehydration accompanies rapid evaporation of water, it tends to cause inhomogeneous dehydration of noodles. Especially, in case of noodles in a lump, the outer portion of the lump is almost completely dried out and hardened when it is immediately after the dehydration, while the inner portion of the lump is less dehydrated and the tissue is rather soft. When the noodle lump in such a state is preserved as they are, evaporation of water from the inner portion gradually proceeds resulting in the contraction of the same portion. Since the outer portion stays to be solid all this while, discrepancy between the two portions causes distortion in the central area of the noodle lump. Also, the noodle strips in the lump break because of the tension from the inner portion.

The inventors further studied and discovered that the above-mentioned problems during the preservation of dried instant noodles are prevented by letting the noodles stand at 50°-100° C. in a humidity controlled place immediately after their dehydration using super-heated steam. This treatment is called tempering. On this occasion, the noodles are to be maintained under such a humidity as to let water evaporate from the inner portion while preventing the water in the outer portion from evaporating, whereby the moisture content of every portion of the noodle lump is made equal as quickly as possible.

It is important to carry out the above tempering treatment at 50°-100° C., because, if the temperature is lower than 50° C., the outer portion of the noodle lump further solidifies and evaporation of water from the inner portion proceeds slowly so that the inner portion contracts to get distorted or broken.

In case the temperature is higher than 100° C., water evaporates from the outer portion as well as from the inner one. Accordingly, the moisture content of the two portions can not be made equal and noodles treated are likely to get scorched. The preferable tempering period is 1-20 minutes.

Better results are obtained when the above treatment is carried out at 80°-95° C. In this case, water in the noodle lump after dehydration is activated more sufficiently and, therefore, the moisture content in every portion of the lump is made equal within a shorter period. Thus, the quality of the noodles won't degrade due to scorching, etc.

Also, as already mentioned, it is essential to adjust humidity within a particular range established considering the uneven distribution of water in the noodle lump in this treatment. In case the treatment is carried out at a lower humidity than said particular range, water evaporates from the outer portion of the dehydrated noodle lump as well as from its inner portion. The results are similar to the case of using a higher temperature than 100° C. as described above.

The treatment at a higher humidity than said particular range causes an increase of the moisture content of the dehydrated noodle lump spoiling the effect of the preceding dehydration process. Particularly, the dehydrated noodles with a high expansion rate contracts in general as they absorb water. Therefore, if a particular humidity range is chosen so as to make the average moisture content of dehydrated noodles equilibrium, said moisture can be distributed equally in every portion of the noodle lump more precisely.

The dried instant noodles finally obtained are packed in bags or suitable containers for commercial sale.

The invention is further explained according to the Examples, and the properties of the instant noodles produced by the present method will be compared with those of the noodles produced by other methods in order to clarify the effect of this invention.

EXAMPLE 1

100 Parts of wheat flour and 3 parts of salt were kneaded with 45 parts of water. The prepared dough was rolled into a sheet of 1.8 mm thickness, and the sheet was cut into strips by a cutting roller.

The raw noodles thus obtained had a moisture content of 39% based on the weight of the noodles. Then the noodles were treated with super-heated steam containing 1 vol.% of air at a flow rate of 5.8 m/second for 45 seconds at a temperature of 200° C. to obtain dried noodles of the invention (Sample A) having a moisture content of 9%. The evaporation rate of water was 0.84 g/second.

EXAMPLE 2

100 Parts of wheat flour and 3 parts of salt were kneaded with 45 parts of water. The prepared dough was rolled into a sheet of 3 mm thickness having a moisture content of 39%. The sheet was transferred to an aging room and was held for 30 minutes where a humidity and a temperature were controlled at 90% and 20° C., respectively. After the aging, the sheet still contained 39% moisture. It was then rolled into a sheet of 1.8 mm thickness and cut with a cutting roller to obtain raw noodles. The noodles were treated with super-heated steam containing 1 vol.% of air at a flow rate of 5.8 m/second for 45 seconds at a temperature of 200° C. The obtained dried noodles of the invention (Sample B) had a moisture content of 9%, and the evaporation rate of water was 0.84 g/second.

CONTRAST EXAMPLE 1

The dried noodles were obtained according to the method of Example 1, except that the treatment with super-heated steam was carried out by using said steam having a temperature of 130° C. and containing 1 vol.% of air for 300 seconds. The dried noodles (Contrast Sample C) had a moisture content of 9.3%, and the evaporation rate of water was 0.13 g/second.

CONTRAST EXAMPLE 2

The dried noodles were obtained according to the method of Example 1, except that the amount of water added was 31.5 parts to adjust the moisture content of raw noodles at 33% and that the treatment with super-heated steam was given for 40 seconds. The dried noodles (Contrast Sample D) containing 9% of moisture were obtained. The evaporation rate of water was 0.78 g/second.

CONTRAST EXAMPLE 3

The raw noodles obtained by the same method as in Example 1 were treated with saturated water vapor at 100° C. for 60 seconds. The steamed noodles had a moisture content of 45%. Then they were treated further with super-heated steam as in Example 1 for 48 seconds to obtain dried noodles (Contrast Sample E) having a moisture content of 9%. The evaporation rate of water was 0.82 g/second.

CONTRAST EXAMPLE 4

The raw noodles having a moisture content of 39% were obtained by the same method as in Example 1. The noodles were treated with heated air at a flow rate of 5.8 m/second and at 200° C. for 40 seconds to obtain dried noodles (Contrast Sample F) having a moisture content of 9%. The evaporation rate of water was 0.82 g/second.

The Samples A to F prepared as above were compared each other with respect to the state of expansion and the status after reconstitution. The results of the comparison are shown in Table 1. As shown in it, Samples A and B, the dried noodles prepared by the present method, had higher expansion rates and better reconstitution than the contrast Samples C to F. It was proved that the products according to the method of this invention were excellent in the state of expansion and the status after reconstitution compared with those of the contrast products.

TABLE 1

| | Item | | | | | | |
|---|---|---|---|---|---|---|---|
| | Evaporation rate of water (g/sec.) | State of expansion | | Status after reconstitution | | | |
| | | Rate of expansion | Texture | Moisture content (%) | Cracks (%) | Blisters (%) | Taste |
| Sample | | | | | | | |
| Sample A | 0.84 | 1.77 | higher expansion homogeneous | 69 | 3.4 | 1.5 | suitably soft excellent taste like conventional boiled noodles |
| Sample B | 0.84 | 1.85 | higher expansion homogeneous | 72 | 0.5 | 1.6 | favorable taste and touch to the mouth like hand-made boiled noodles |
| Sample C | 0.13 | 1.36 | lower expansion | 63 | 3.1 | 1.2 | hard and stick to teeth |
| Sample D | 0.78 | 1.50 | layered cracks uneven expansion | 67 | 59.3 | 3.4 | stick to teeth taste of raw flour |
| Sample E | 0.82 | 1.60 | superficial blisters interior cracks | 59 | 30.2 | 20.7 | hard and stick to teeth unpleasant touch to the mouth due to blisters |
| Sample F | 0.82 | 1.58 | cavity in the | 62 | 63.3 | 0.8 | overcooked outside with |

TABLE 1-continued

| | | State of expansion | Status after reconstitution | | | |
|---|---|---|---|---|---|---|
| Sample | Evaporation rate of water (g/sec.) | Rate of expansion / Texture | Moisture content (%) | Cracks (%) | Blisters (%) | Taste |
| | | central part uneven & inadequate expansion | | | | a hard core inadequate reconstitution |

Remarks concerning Table 1:

Rate of expansion = $\dfrac{\text{sectional area of dried noodles after the treatment with superheated steam}}{\text{sectional area of raw noodles}}$ To observe the status after reconstitution, the samples were boiled in water for 5 minutes.

Rate of cracking = $\dfrac{\text{length of cracks}}{\text{whole length of an individual noodle}} \times 100\ (\%)$ Blister: the average number of blisters per 10 cm of an individual noodle

EXAMPLE 3

100 Parts of wheat flour, 1 part of Kampun and 40 parts of water were mixed and kneaded to prepare a dough. The dough was rolled into a sheet of 1.5 mm thickness and the sheet was cut by a cutting roller to obtain raw noodles for one serving. (120 g; moisture content 37.3%). The raw noodles were forced apart and packed evenly and homogeneously in a container of 130×130×30 mm. They were treated with super-heated steam containing 1 vol.% of air at a flow rate of 10 m/second at 180° C. for 50 seconds to obtain dried noodles of the present invention (Sample G) having a moisture content of 9.8%. The evaporation rate of water was 0.66 g/second.

EXAMPLE 4

The dried noodles (the moisture content of the surface of the noodle strip was 8.4% and the interior of it was 13.4%) were obtained according to the method of Example 3. They were transferred to a tempering room where a temperature and a relative humidity were controlled at 90° C. and 40%, respectively. They were stored for 10 minutes to obtain dried noodles (Sample H) of the present invention. The moisture was evenly distributed in the noodles. The moisture content of the noodles was 9.1%.

The dried noodles of the present invention (Sample J) had a moisture content of 9.2%. The evaporation rate of water was 0.70 g/second.

EXAMPLE 6

The raw noodles obtained by the method of Example 3 were treated with air heated at 40° C., at a flow rate of 2 m/second for 20 seconds to harden the surface of the raw noodles. The moisture content of the noodles after the hardening treatment was 36.8%. The noodles were then forced apart and separated each other and packed in a container as described in Example 3.

The super-heated steam treatment was carried out to obtain dried noodles of the present invention (Sample K) having a moisture content of 9.3%. The evaporation rate of water was 0.65 g/second.

The Samples G to K prepared as above were compared each other with respect to the properties illustrated in Table 2. The dried noodles treated with tempering after heating with super-heated steam do not break during their storage and have an excellent property as preserved foods.

The dried noodles prepared by the treatment with super-heated steam containing a particular amount of air (cf. Sample J) and those treated with hardening on their surface prior to the treatment with super-heated steam (cf. Sample K) are homogeneously dehydrated and have an even expansion rate.

TABLE 2

| | Rate of expansion | | | Degree of dehydration (moisture content %) | | Thickness of a noodle lump (m/m) | Rate of break* (%) | | | |
|---|---|---|---|---|---|---|---|---|---|---|
| Sample | average | surface | interior | surface | interior | | after 2 hours | after 1 day | after 7 days | taste** |
| Sample G | 1.68 | 1.74 | 1.49 | 8.4 | 13.4 | 24.6 | 5.3 | 15.3 | 32.6 | excellent taste |
| Sample H | 1.66 | 1.71 | 1.48 | 8.8 | 9.5 | 24.5 | 0.3 | 0.8 | 0.8 | excellent taste |
| Sample J | 1.70 | 1.75 | 1.59 | 8.6 | 9.6 | 27.4 | 1.2 | 3.2 | 4.2 | (homogeneous and excellent taste) |
| Sample K | 1.71 | 1.73 | 1.62 | 8.8 | 9.6 | 27.3 | 1.0 | 2.9 | 3.3 | (homogeneous and excellent taste) |

Remarks:
The data shown in Table 2 indicate the average data for 10 samples.

Rate of expansion = $\dfrac{\text{sectional area of the dried noodle}}{\text{sectional area of a raw noodle}}$ Rate of break = $\dfrac{\text{total number of noodles for one sample} - \text{number of noodles without any break}}{\text{total number of noodles for one sample}} \times 100\ (\%)$ (The total number of noodles was counted when they were raw and the number of unbroken noodles was counted after boiling for 5 minutes.)
*Each sample was packed in a moisture-proof film container, sealed and stored at 20° C.
**Taste and flavour of the noodles were tested after boiling them for 5 minutes.

EXAMPLE 5

The dried noodles were obtained according to the method of Example 3, except that the treatment with super-heated steam was carried out by using said steam containing 5% of air.

We claim:
1. A method of preparing dried noodles having a moisture content of less than 15% which comprises the steps of:

forming a dough comprising wheat flour, seasonings and water into raw noodles, said raw noodles having a moisture content of 35–45%; and (b) dehydrating said raw noodles by blowing super-heated steam onto said raw noodles at a water evaporation rate of 0.25–1.00 g/second per 100 g of said raw noodles to produce dry noodles having a moisture content of less than 15 percent.

2. The method according to claim 1, wherein the super-heated steam of step (b) has a temperature of 120°–350° C.

3. The method according to claim 1, wherein said super-heated steam contains 2–12 vol.% of air based on the volume of said super-heated steam.

4. The method according to claim 1, wherein a further step is introduced between steps (a) and (b) comprising blowing heated air against said noodles whereby the surface of the individual raw noodle is hardened.

5. The method according to claim 4, wherein said raw noodle is hardened by blowing air heated at 35°–65° C. against said noodle at a rate of 1–3 m/second for 10–30 seconds.

6. The method according to claim 1, wherein a further step is introduced between steps (a) and (b) comprising subjecting said raw noodles to ageing.

7. The method according to claim 6, wherein the aging step is carried out by holding said raw noodles in a humidity controlled place at a temperature of 5°–40° C. for 5–90 minutes.

8. The method according to claim 6, wherein said aging step is carried out by holding said raw noodles in a humidity controlled place at a temperature of 20°–35° C. for 10–30 minutes.

9. The method according to claim 1, wherein subsequent to the dehydration of said raw noodles in step (b) the dried noodles are subjected to tempering.

10. The method according to claim 9, wherein said tempering step is carried out by holding said dried noodles in a humidity controlled place at a temperature of 50°–100° C. for 1–20 minutes.

11. The method of claim 1, wherein the dough or a sheet of kneaded flour formed thereof is subjected to ageing prior to the formation of raw noodles.

12. The method of claim 11, wherein the ageing step is carried out by holding the dough or sheet of kneaded flour in a humidity controlled place at a temperature of 5°–40° C. for 5–90 minutes.

* * * * *